UNITED STATES PATENT OFFICE.

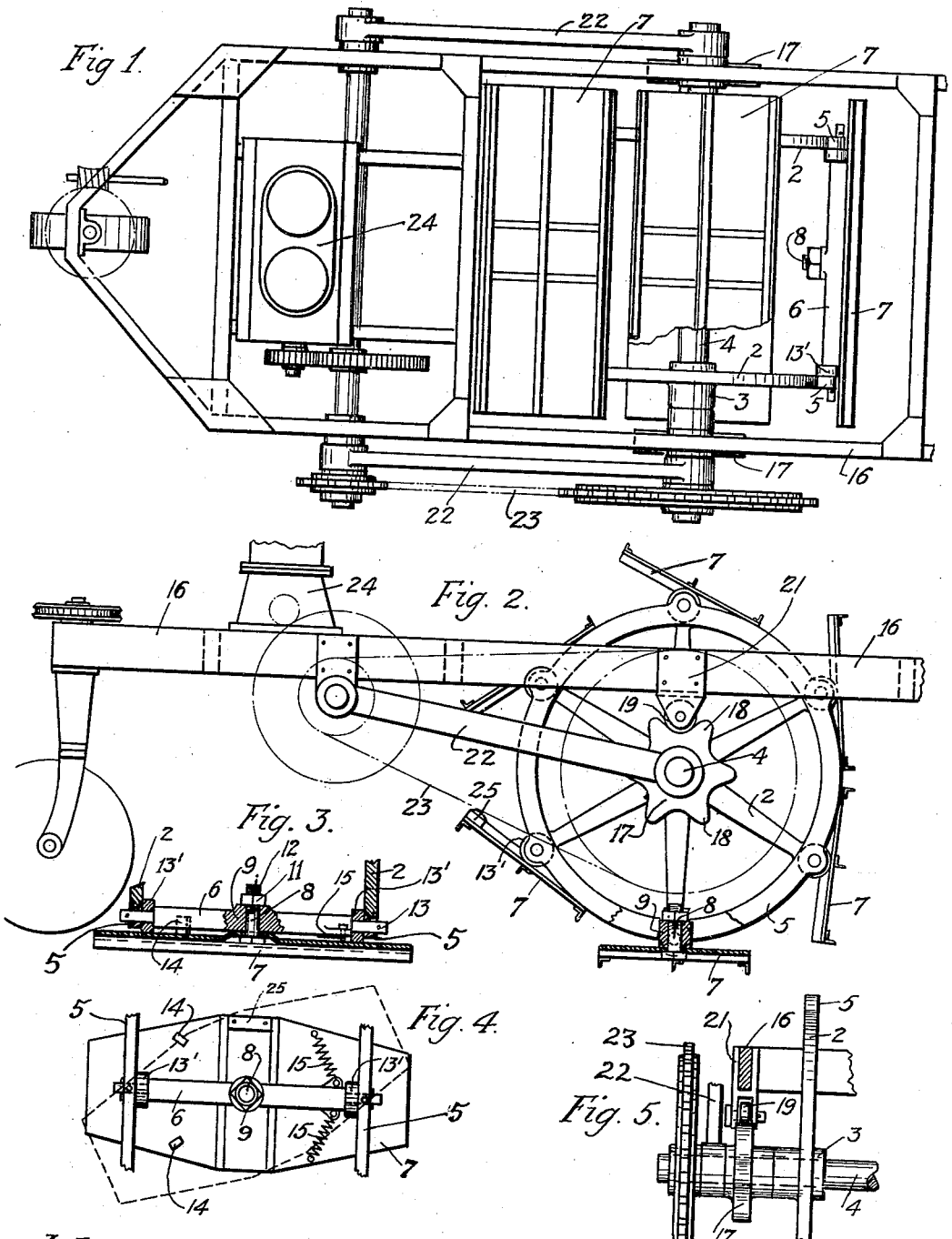

LESLIE S. CUSHMAN, OF LOS ANGELES, CALIFORNIA.

TRACTION-VEHICLE.

1,080,101.     Specification of Letters Patent.     Patented Dec. 2, 1913.

Application filed October 1, 1912. Serial No. 723,430.

*To all whom it may concern:*

Be it known that I, LESLIE S. CUSHMAN, a citizen of the United States, residing at the city of Los Angeles, State of California, have invented a new and useful Traction-Vehicle, of which the following is a specification.

An object of this invention is to improve upon devices of the same general character by the provision of a more simple, durable and inexpensive compensating or neutralizing device operating between the body of the vehicle and the frame of an ambulatory wheel, whereby the up and down movements of said wheel are prevented from disturbing the horizontal position of the vehicle body.

Another object is to construct the wheel itself in a more substantial and durable manner than other ambulatory wheels and to provide a more economical way of making the bearings and other parts of the wheel. The bearings of this wheel are all rotary bearings and are more nearly dust proof than the bearings of ambulatory wheels having sliding parts.

Other objects and advantages may hereinafter appear.

Referring to the accompanying drawings, which illustrate the invention, Figure 1 is a broken plan view of a traction vehicle showing the same provided with an ambulatory wheel. Fig. 2 is a side elevation of Fig. 1, a portion of the wheel being sectioned. Fig. 3 is a sectional detail of one of the feet. Fig. 4 is a plan view of said foot. Fig. 5 is a broken detail elevation, the vehicle body being sectioned.

Referring in detail to the drawings, the wheel comprises two sets of spokes 2 each set radiating from a hub 3 fixed to shaft 4. The ends of the spokes 2 enter the felly 5, this construction being duplicated near each side of the vehicle, as seen in plan in Fig. 1. The fellies 5 are united at intervals by means of pivot shafts 6 upon which are pivoted the elongated traction feet 7 as best shown in Fig. 2. For the purpose of connecting said feet 7 with said pivot shafts each of said feet is provided at its mid length with an inwardly projecting radial pivot stud 8 by which the foot 7 is connected with the pivot shaft 6. As shown in Fig. 3, said pivot shaft 6 is provided with an enlarged center 9 through which the pivot stud 8 extends, said stud preferably having a nut or washer 11 and pin 12 to secure the pivot shaft thereto. Said pivot shaft may have a reduced portion 13 at each end thereof where it is pivoted to the spoke 2. 13' are antifriction rollers. In order to limit the pivotal movement of each foot 7 with relation to the stud 8 stop lugs 14 are carried by each foot 7 near one end thereof. The centering springs 15 are secured to the other end of the pivot shaft 6 and operate between said pivot shaft and the foot 7 to normally hold the foot in such a position that the pivot shaft extends along the mid length of said foot. This construction is provided to adapt the device for turning corners more readily. It makes it unnecessary to provide a separate wheel at each side of the vehicle. It will be seen that during the rotation of this ambulatory wheel there will be an up and down movement of said wheel as a whole every time the wheel moves from a position in which one of the feet 7 begins to touch the ground until the wheel reaches a position in which said foot begins to leave the ground. In order to compensate for these successive up and down movements of the wheel, so that said movements will be neutralized at all points so as not to disturb the horizontal position of the vehicle body 16, a compensating or neutralizing device is provided, which will next be described.

To each end of the shaft 4 is fixed a cam wheel 17 having a plurality of outwardly projecting cams or cogs 18. With each cam wheel 17 coöperates a roller 19 having its bearing in a bracket 21 carried by the vehicle body 16. Each projection 18 of the cam wheel 17 is of such contour as to keep the vehicle body 16 at the same elevation during all circumferential positions of said cam wheel 17.

22 designates well known radius rods, and 23 the driving chain, which is operatively connected with the motor 24 by well known mechanism which need not be described in detail, as the same forms no part of this invention.

In order to keep the lower edge of each descending foot 7 from striking the earth too soon, each of said feet is provided with a weight 25 to keep the lower edge thereof close to the felly of the wheel as the foot descends to the earth.

In operation, whenever this traction wheel reaches the point shown in Fig. 2, wherein it rests squarely upon one of the traction feet, the roller 19 will occupy a position midway between two adjacent cam projections 18, and as the wheel rotates farther, and consequently begins to descend toward the limit of one of its downward movements, said roller will neutralize the downward movement of the wheel by moving up toward the point of the next cam projection 18 and will, therefore, lift the vehicle body 16 relatively to the wheel. The vehicle body, however, remains stationary as to its actual height and will continue to remain so while the roller moves over the point of the projection 18 and along the other side thereof.

This invention is believed to improve over other ambulatory wheels by using a single neutralizing device between the ambulatory wheel and the body of the vehicle instead of a multiplicity of such devices, one for each of the soil engaging feet.

I claim:

1. In combination, a rotary frame, a series of feet carried by said frame, a vehicle body supported by said rotary frame, and a compensating or neutralizing device acting between said rotary frame as a whole and said vehicle body to maintain said vehicle body at the same elevation during the rotation of said rotary frame, said compensating device consisting of two coöperating cam elements, one of said elements being carried by said rotary frame and the other being carried by the vehicle body.

2. In combination, a rotary frame, a series of feet pivoted to said frame, a vehicle body supported by said frame, a multiple faced cam mounted axially of said rotary frame and in fixed relation thereto to rotate therewith, and a roller carried by said vehicle body, said roller coöperating with said cam to form a device for neutralizing the vertical movements of said rotary frame to maintain said vehicle body at the same elevation.

3. In combination, a rotary frame, a series of feet carried by said frame, a vehicle body supported by said frame, a cam mounted axially of said frame and in fixed relation thereto to rotate therewith, said cam having a series of radial projections, one for each space between said feet, and a roller carried by said vehicle body, said roller traveling over said projections of said cam to form a device for neutralizing the vertical movements of said rotary frame to maintain said vehicle body at the same elevation.

In testimony whereof I have hereunto signed my name in the presence of two subscribing witnesses at Los Angeles, in the county of Los Angeles and State of California, this 23rd day of September, 1912.

LESLIE S. CUSHMAN.

Witnesses:
ALBERT H. MERRILL,
WILLIAM GORBACH.

Copies of this patent may be obtained for five cents each, by addressing the "Commissioner of Patents, Washington, D. C."